R. L. NELSON.
COFFEE-POT.
No. 189,253.        Patented April 3, 1877.
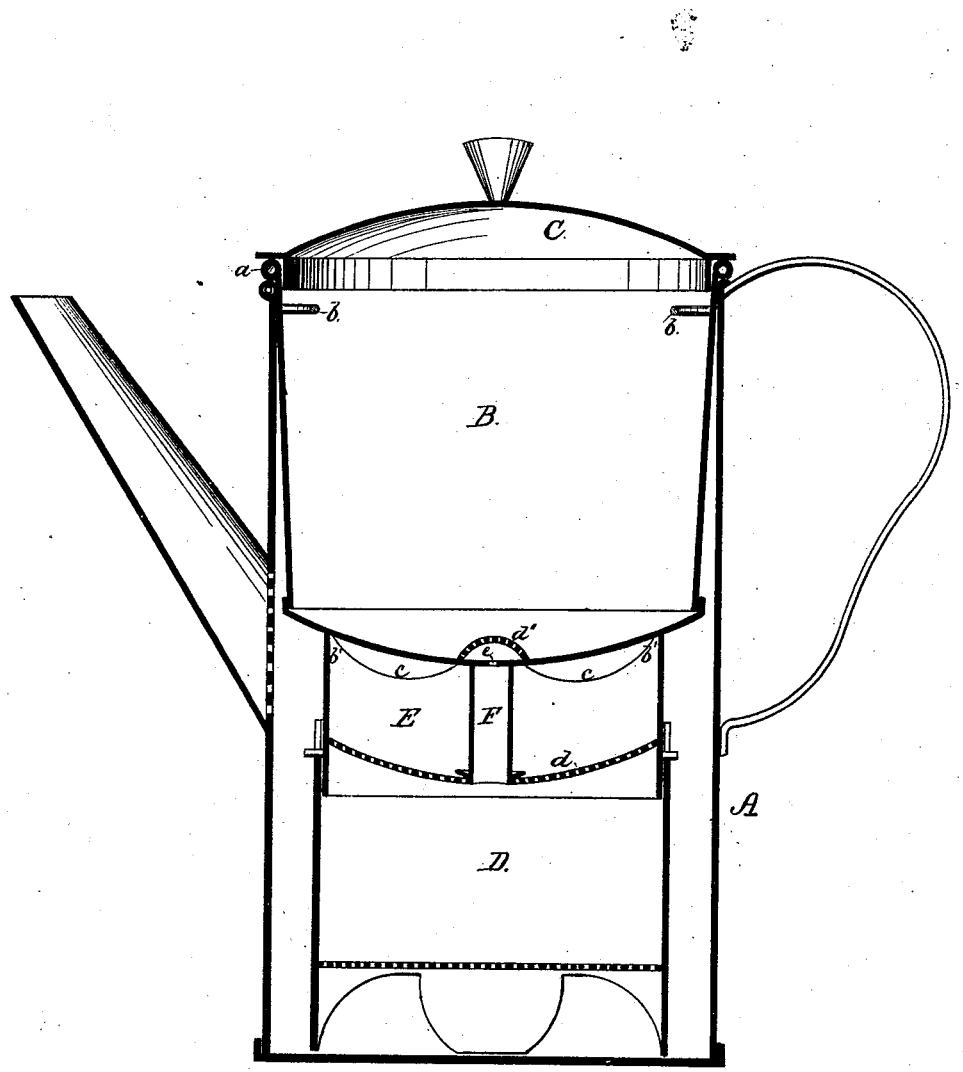
WITNESSES:
W. W. Hollingsworth
Amos W. Hart.
INVENTOR:
Richard L. Nelson
BY
ATTORNEYS.

UNITED STATES PATENT OFFICE.

RICHARD L. NELSON, OF ORANGE COURT-HOUSE, VIRGINIA.

IMPROVEMENT IN COFFEE-POTS.

Specification forming part of Letters Patent No. 189,253, dated April 3, 1877; application filed February 28, 1877.

*To all whom it may concern:*

Be it known that I, RICHARD L. NELSON, of Orange Court-House, in the county of Orange and State of Virginia, have invented a new and useful Improvement in Coffee-Pots; and I do hereby declare that the following is a full, clear, and exact description of the same.

This invention is an improvement upon that for which Letters Patent have been granted me under date of March 6, 1877. In said former invention a water reservoir or receptacle is attached to the cover of the coffee-pot exteriorly, and a tube extends therefrom down through the cover. A coffee-holder is placed within the pot, and its detachable ring or cap, which confines the top strainer of the coffee-holder, is also rigidly connected to the cover of the pot. The whole device constitutes what I designate, by its function, a "drip attachment" for coffee-pots.

The objects aimed at in the present improvement are to render the drip attachment more compact, to lessen the number of parts composing it, to reduce the cost of the same, and to lessen the time required for making coffee.

To these ends the construction and arrangement of parts are as follows:

In the accompanying drawing, forming part of this specification, I represent a vertical central section of a coffee-pot and the improved drip attachment applied thereto.

The coffee-pot A is cylindrical in form, being what is known in the trade as "straight-sided." The water-reservoir B is slightly tapered from the top downward, and provided with a rim, a, which rests upon the edge of the pot A. The reservoir has a cover, C, such as coffee-pots are usually provided with, and has also lugs or ears b, which are attached to its inner sides near the top, for use in lifting or removing the reservoir and its attachment from the coffee-pot. The coffee-holder D is constructed substantially in the manner described in my aforesaid patent; but in this instance the upper ring E is attached directly to the convex bottom of the reservoir B by means of ears or extensions b', between which are the openings c, for admitting water to the space above the upper strainer d. A small hole, e, is formed in the bottom of the reservoir, and a drip-tube, F, extends from the reservoir to strainer d, to both which it is permanently attached. A wire-gauze cap, d', is applied to cover the aperture e, which, by straining the water, prevents the hole being clogged or closed. The coffee-holder resting on the bottom of the pot A, and the top of the reservoir B closely fitting within the top of the pot, the entire drip attachment is prevented from moving or rattling within the pot.

A cloth strainer may be substituted for the wire-gauze d, when desired, as explained in my former patent.

It will be perceived that by the construction and arrangement of parts above described, the water-reservoir is brought within the limits of the pot, the cover for which does duty also as top for the pot. Retention of heat in the water placed in the reservoir is also promoted, so that the coffee-essence is more rapidly and perfectly extracted from the coffee-grounds.

This concentration of water-reservoir and coffee-holder within the pot likewise gives symmetry to the proportions of the pot and avoids the objection of top-heaviness.

The attachment does not require to be removed from the coffee-pot, except for cleansing and supplying fresh grounds.

What I claim is—

As the improvement herein described, the combination, with the pot A, of the tapered water-reservoir B, the coffee-holder, and its ring E, attached directly to the bottom of the reservoir by means of ears b', thus leaving openings c, and the tube F, provided with the strainer d', all as shown and described, whereby the entire drip attachment is concentrated within the pot, as and for the purposes set forth.

RICHARD L. NELSON.

Witnesses:
SOLON C. KEMON,
AMOS W. HART.